(12) United States Patent
Kudo et al.

(10) Patent No.: US 8,800,160 B2
(45) Date of Patent: Aug. 12, 2014

(54) SHEET LENGTH MEASURING DEVICE AND IMAGE FORMING APPARATUS

(75) Inventors: Koichi Kudo, Kanagawa (JP); Makoto Nakura, Ibaraki (JP); Naoto Ueda, Ibaraki (JP); Satoshi Ueda, Ibaraki (JP); Akira Kobashi, Ibaraki (JP); Shingo Takai, Ibaraki (JP)

(73) Assignee: Ricoh Company, Limited, Tokyo (JP)

( * ) Notice: Subject to any disclaimer, the term of this patent is extended or adjusted under 35 U.S.C. 154(b) by 256 days.

(21) Appl. No.: 13/476,359

(22) Filed: May 21, 2012

(65) Prior Publication Data
US 2012/0291299 A1    Nov. 22, 2012

(30) Foreign Application Priority Data

May 19, 2011   (JP) ................................. 2011-112082
Oct. 27, 2011   (JP) ................................. 2011-235684
Apr. 23, 2012   (JP) ................................. 2012-098096

(51) Int. Cl.
*G01B 5/04*     (2006.01)
*G01B 3/12*     (2006.01)

(52) U.S. Cl.
USPC ............................................. 33/773; 33/734

(58) Field of Classification Search
USPC .......... 33/732, 733, 734, 735, 743, 747, 772, 33/773, 775
See application file for complete search history.

(56) References Cited

U.S. PATENT DOCUMENTS

| | | | |
|---|---|---|---|
| 8,131,171 B2 * | 3/2012 | Ohshima et al. ................ | 399/45 |
| 2010/0329759 A1 * | 12/2010 | Furuya et al. ................ | 399/389 |
| 2011/0020020 A1 * | 1/2011 | Ohshima et al. ................ | 399/45 |
| 2011/0058828 A1 * | 3/2011 | Tsukamoto et al. ............ | 399/45 |
| 2011/0064425 A1 * | 3/2011 | Kazama et al. ................ | 33/773 |
| 2012/0201552 A1 * | 8/2012 | Hirai et al. ..................... | 399/49 |
| 2012/0263482 A1 * | 10/2012 | Shiozawa ........................ | 399/39 |
| 2013/0164671 A1 * | 6/2013 | Matsui et al. ............. | 430/123.56 |
| 2013/0228969 A1 * | 9/2013 | Nakura et al. ................ | 271/272 |
| 2014/0044466 A1 * | 2/2014 | Murata et al. ................ | 399/367 |

FOREIGN PATENT DOCUMENTS

| | | |
|---|---|---|
| JP | 2619974 B2 | 3/1997 |
| JP | 2743203 B2 | 2/1998 |
| JP | 3462022 B2 | 8/2003 |
| JP | 2007-132992 A | 5/2007 |

(Continued)

OTHER PUBLICATIONS

English language abstract for JP-10-148976 which corresponds to JP-3462022-B2.
English language abstract for JP-2004-229486 which corresponds to JP-3957295-B2.
English language abstract for JP-2007-161427 which corresponds to JP-4388013-B2.

(Continued)

*Primary Examiner* — G. Bradley Bennett
(74) *Attorney, Agent, or Firm* — Harness, Dickey & Pierce, P.L.C.

(57) ABSTRACT

A sheet length measuring device includes a rotating body configured to rotate with a movement of a sheet in a conveying direction; a position detecting unit configured to detect leading and trailing ends of the sheet passing through a position of the rotating body; a measuring unit configured to measure a rotation amount of the rotating body and output an origin signal per one revolution of the rotating body; a storage unit configured to store changes of a sheet conveying amount with respect to respective rotation angles in one revolution of the rotating body; and a calculating unit configured to calculate a corrected length of the sheet from a value obtained from a rotation angle of the rotating body when the leading end of the sheet is detected and a value obtained from a rotation angle of the rotating body when the trailing end of the sheet is detected.

13 Claims, 9 Drawing Sheets

(56) References Cited

FOREIGN PATENT DOCUMENTS

| JP | 3957295 | B2 | 5/2007 |
| JP | 4388013 | B2 | 10/2009 |
| JP | 2010-241600 | A | 10/2010 |
| JP | 2011-006202 | A | 1/2011 |

OTHER PUBLICATIONS

English language abstract for JP-04-121345 which corresponds to JP-2619974-B2.
English language abstract for JP-03-172255 which corresponds to JP-2743203-B2.

* cited by examiner

SHEET LENGTH MEASURING DEVICE AND IMAGE FORMING APPARATUS

CROSS-REFERENCE TO RELATED APPLICATIONS

The present application claims priority to and incorporates by reference the entire contents of Japanese Patent Application No. 2011-112082 filed in Japan on May 19, 2011, Japanese Patent Application No. 2011-235684 filed in Japan on Oct. 27, 2011 and Japanese Patent Application No. 2012-098096 filed in Japan on Apr. 23, 2012.

BACKGROUND OF THE INVENTION

1. Field of the Invention

The present invention relates to a sheet length measuring device and an image forming apparatus.

2. Description of the Related Art

In the past, there has been known a technology for installing a sheet length measuring device (transfer target length measuring device) that measures a length of a sheet, such as a transfer paper, in an image forming apparatus, such as a copier or a printer (see, for example, Japanese Patent Application Laid-open No. 2010-241600).

In Japanese Patent Application Laid-open No. 2010-241600 or the like, disclosed is a technology that is intended to measure a length of a transfer target (sheet) with a high degree of accuracy even when a roller diameter of a carriage roller is changed by eccentricity, thermal expansion, or the like, and calculates a length of a transfer target based on a conveying distance and a rotation amount of a rotating body in a first measuring period and a conveying speed in a second measuring period.

In the above-disclosed technology of Japanese Patent Application Laid-open No. 2010-241600, an effect of being able to measure a length of a sheet with a high degree of accuracy even in the event of the occurrence of eccentricity, thermal expansion, or the like in a rotating body (carriage roller) can be expected, but the measurement of a sheet length is complicated, such as there being a need to measure a conveying distance of a sheet or the like several times.

Therefore, there is a need for a device capable of measuring a length of a sheet with a high degree of accuracy by a relatively simple and easy method even in the event of the occurrence of eccentricity, thermal expansion, or the like in a rotating body.

SUMMARY OF THE INVENTION

It is an object of the present invention to at least partially solve the problems in the conventional technology.

According to an embodiment, there is provided a sheet length measuring device that includes a rotating body configured to rotate with a movement of a sheet in a conveying direction; a position detecting unit configured to detect a leading end and a trailing end of the sheet passing through a position of the rotating body; a rotation amount measuring unit configured to measure a rotation amount of the rotating body and output a pulse signal as an origin signal per one revolution of the rotating body; a storage unit configured to store changes of a sheet conveying amount with respect to respective rotation angles in one revolution of the rotating body, the rotation angles being measured by the rotation amount measuring unit with respect to an output of the origin signal; and a calculating unit configured to calculate a corrected length of the sheet from a value obtained from a rotation angle of the rotating body with respect to an output of the origin signal when the leading end of the sheet is detected by the position detecting unit and a value obtained from a rotation angle of the rotating body with respect to an output of the origin signal when the trailing end of the sheet is detected by the position detecting unit.

According to another embodiment, there is provided a sheet length measuring device that includes a rotating body configured to rotate with a movement of a sheet in a conveying direction; a position detecting unit configured to detect a leading end and a trailing end of the sheet passing through a position of the rotating body; a rotation amount measuring unit configured to measure a rotation amount of the rotating body; an origin signal generating unit configured to generate and output a pulse signal as an origin signal per one revolution of the rotating body from variable components in one revolution of the rotating body measured by the rotation amount measuring unit; a storage unit configured to store changes of a sheet conveying amount with respect to respective rotation angles in one revolution of the rotating body, the rotation angles being measured by the rotation amount measuring unit with respect to an output of the origin signal from the origin signal generating unit; and a calculating unit configured to calculate a corrected length of the sheet from a value obtained from a rotation angle of the rotating body with respect to an output of the origin signal when the leading end of the sheet is detected by the position detecting unit and a value obtained from a rotation angle of the rotating body with respect to an output of the origin signal when the trailing end of the sheet is detected by the position detecting unit.

According to still another embodiment, there is provided an image forming apparatus that includes a rotating body configured to rotate with a movement of a sheet in a conveying direction; a position detecting unit configured to detect a leading end and a trailing end of the sheet passing through a position of the rotating body; a rotation amount measuring unit configured to measure a rotation amount of the rotating body and output a pulse signal as an origin signal per one revolution of the rotating body; a storage unit configured to store changes of a sheet conveying amount with respect to respective rotation angles in one revolution of the rotating body, the rotation angles being measured by the rotation amount measuring unit with respect to an output of the origin signal; and a calculating unit configured to calculate a corrected length of the sheet from a value obtained from a rotation angle of the rotating body with respect to an output of the origin signal when the leading end of the sheet is detected by the position detecting unit and a value obtained from a rotation angle of the rotating body with respect to an output of the origin signal when the trailing end of the sheet is detected by the position detecting unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
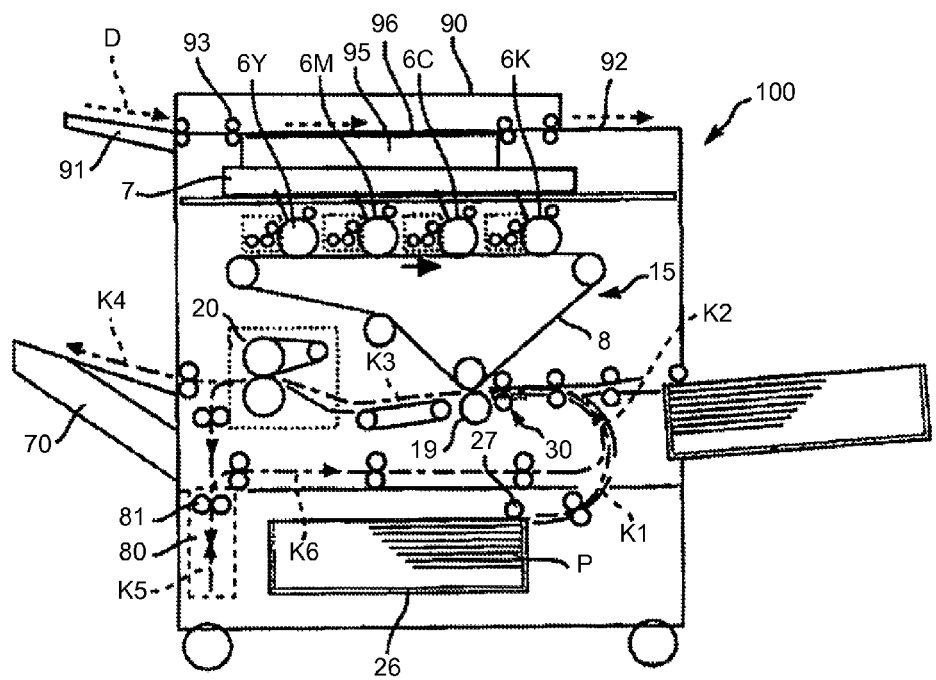
FIG. 1 is an overall configuration diagram illustrating an image forming apparatus according to embodiments of the invention.

Hereinafter, embodiments of a sheet length measuring device, an image forming apparatus, a sheet length measuring method, and a program according to the invention will be described in detail with reference to the accompanying drawings.

First Embodiment

Hereinafter, embodiments of the invention will be described in detail with reference to the drawings. Also, same reference numerals or symbols will be used to denote the same elements in the respective drawings, and a redundant description thereof will be suitably simplified or will not be repeated.

First, an overall configuration and operation of an image forming apparatus will be described with reference to FIGS. 1 and 2. FIG. 1 is a configuration diagram illustrating a digital color copier as an image forming apparatus, and FIG. 2 is an enlarged view illustrating an image forming unit thereof.

As illustrated in FIG. 1, an intermediate transfer belt device 15 is installed at a center of an image forming apparatus body 100. Also, image forming units 6Y, 6M, 6C, and 6K corresponding to respective colors (yellow, magenta, cyan, and black) are installed in parallel in such a way as to face an intermediate transfer belt 8 of the intermediate transfer belt device 15. A sheet length measuring device 30 is located at a right lower side of the intermediate transfer belt device 15, and is installed on a conveying path through which a sheet P (recording medium) is conveyed toward an image transferring unit.

Also, at a top side of the image forming apparatus body 100, a document conveying unit 90 is installed to convey a document D, which is loaded on a document feed tray 91, toward a document reading unit 95 (contact glass 96) and discharge the document D to a document discharge tray 92 by carriage rollers 93.

Figure 2:
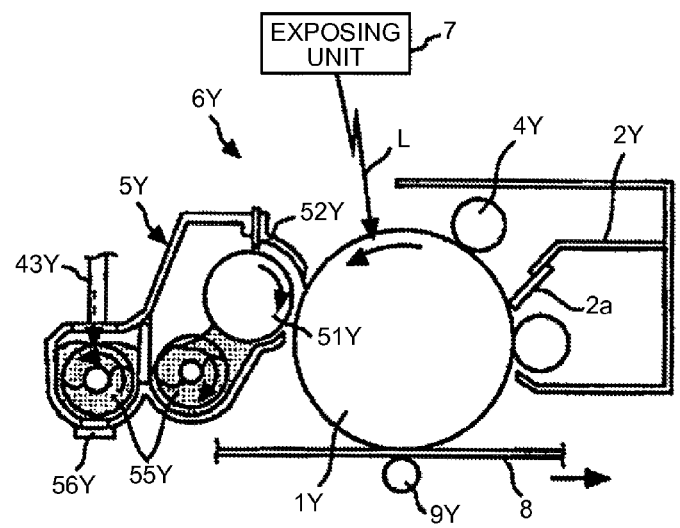
FIG. 2 is a cross-sectional view illustrating an image forming unit.

Referring to FIG. 2, the image forming unit 6Y corresponding to a yellow color includes a photosensitive drum 1Y serving as an image carrier, a charging unit 4Y disposed around the photosensitive drum 1Y, a developing unit 5Y, a cleaning unit 2Y, and a neutralizing unit (not illustrated). Then, an image forming process (a charging operation, an exposing operation, a developing operation, a transferring operation, and a cleaning operation) is performed on the photosensitive drum 1Y, so that a yellow image is formed on the photosensitive drum 1Y.

Also, the other three image forming units 6M, 6C, and 6K have substantially the same configuration as the image forming unit 6Y corresponding to a yellow color, except colors of toners used, and form images corresponding to the respective toner colors. Hereinafter, a description of the other three image forming units 6M, 6C, and 6K will not be provided, and only the image forming unit 6Y corresponding to a yellow color will be described.

Referring to FIG. 2, the photosensitive drum 1Y is driven by a driving motor (not illustrated) in a counterclockwise direction of FIG. 2. Then, at a position of the charging unit 4Y, a surface of the photosensitive drum 1Y is charged uniformly (which is a charging operation).

Thereafter, the surface of the photosensitive drum 1Y arrives at an irradiation position of laser light L generated from an exposing unit 7, and an electrostatic latent image corresponding to a yellow color is formed by exposing and scanning at this position (which is an exposing operation). Herein, the laser light L generated from the exposing unit 7 is based on image information of the document D that is conveyed onto the contact glass 96 by the document conveying unit 90 and is scanned by the document reading unit 95.

Thereafter, the surface of the photosensitive drum 1Y arrives at an opposite position with respect to the developing unit 5Y, and an electrostatic latent image is developed at this position, so that a yellow toner image (image) is formed (which is a developing operation).

Thereafter, the surface of the photosensitive drum 1Y arrives at an opposite position with respect to the intermediate transfer belt 8 and a transfer roller 9Y, and at this position, a toner image on the photosensitive drum 1Y is transferred onto the intermediate transfer belt 8 (which is a primary transferring operation). At this time, a slight non-transferred toner is left on the photosensitive drum 1Y.

Thereafter, the surface of the photosensitive drum 1Y arrives at an opposite position with respect to the cleaning unit 2Y, and at this position, a non-transferred toner left on the photosensitive drum 1Y is recovered in the cleaning unit 2Y by a cleaning blade 2a (which is a cleaning operation).

Finally, the surface of the photosensitive drum 1Y arrives at an opposite position with respect to the neutralizing unit (not illustrated), and at this position, a remaining potential on the photosensitive drum 1Y is removed. Thus, a series of image forming processes performed on the photosensitive drum 1Y is completed.

Also, the above-described image forming process is performed in the other image forming units 6M, 6C, and 6K in the same manner as in the yellow image forming unit 6Y. In other words, laser light L based on image information of the document D scanned by the document reading unit 95 is irradiated from the exposing unit 7, which is disposed on the image forming unit, onto photosensitive drums 1M, 1C, and 1K of the respective image forming units 6M, 6C, and 6K. In detail, the exposing unit 7 generates laser light L from a light source and irradiates the laser light L through a plurality of optical elements onto the photosensitive drums in a main-scanning direction while scanning the laser light L to a rotated polygon mirror.

Thereafter, the respective color toner images formed on the respective photosensitive drums through the developing process are overlappingly transferred onto the intermediate transfer belt 8 serving as an image carrier. Thus, a color image is formed on the intermediate transfer belt 8.

Figure 3:
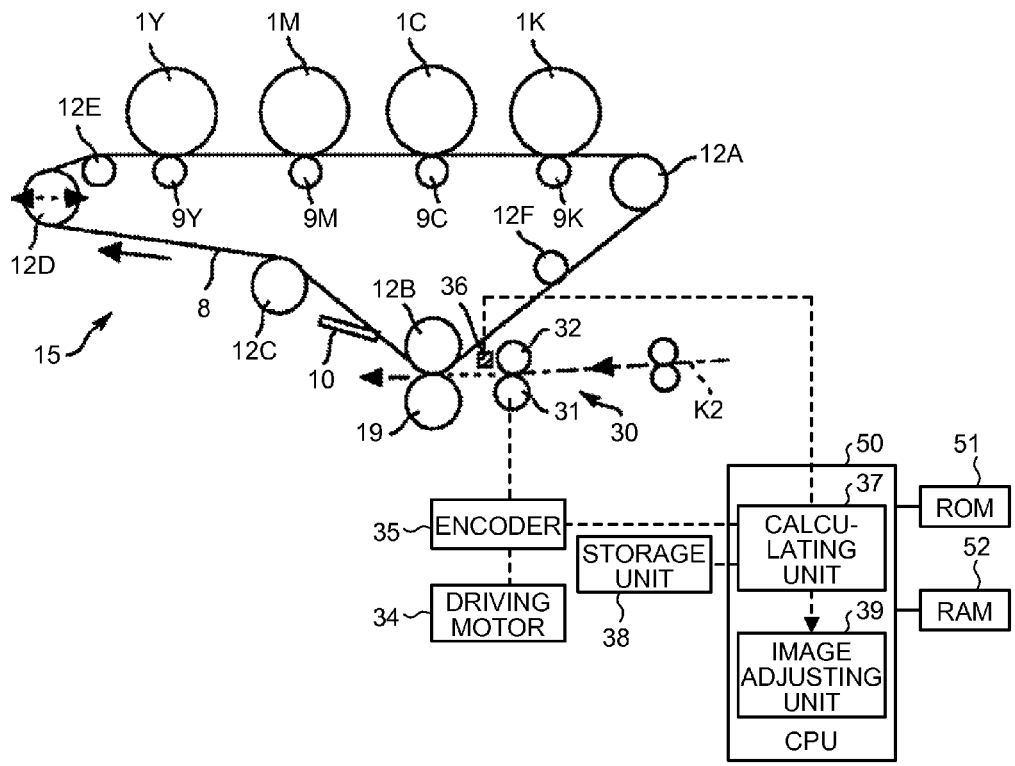
FIG. 3 is an explanatory diagram illustrating a sheet length measuring device and a neighborhood thereof according to a first embodiment.

Herein, referring to FIG. 3, the intermediate transfer belt device 15 includes an intermediate transfer belt 8, four transfer rollers 9Y, 9M, 9C, and 9K, a driving roller 12A, an opposite roller 12B, tension rollers 12C to 12F, an intermediate transfer cleaning unit 10, and the like. The intermediate transfer belt 8 is tensioned/supported by a plurality of roller members 12A to 12F and also is moved in an arrow direction of FIG. 3 by the rotation of one roller member (driving roller) 12A.

The intermediate transfer belt 8 is inserted between the four transfer rollers 9Y, 9M, 9C, and 9K and the respective photosensitive drums 1Y, 1M, 1C, and 1K to form primary transfer nips. Then, a transfer voltage (transfer bias) having an opposite polarity to the toner is applied to the transfer rollers 9Y, 9M, 9C, and 9K.

Then, the intermediate transfer belt 8 (image carrier) is driven in the arrow direction and sequentially passes through the primary transfer nips of the transfer rollers 9Y, 9M, 9C, and 9K. Thus, the respective color toner images on the photosensitive drums 1Y, 1M, 1C, and 1K are primarily transferred onto the intermediate transfer belt 8 in an overlapping manner.

Thereafter, the intermediate transfer belt 8, on which the respective color toner images are transferred in an overlapping manner, arrives at an opposite position (image transferring unit) with respect to a secondary transfer roller 19. At this position, the intermediate transfer belt 8 is inserted between the opposite roller 12B and the secondary transfer roller 19 to form a secondary transfer nip (image transferring unit). Then, four color toner images formed on the intermediate transfer belt 8 are transferred onto a sheet P such as a transfer paper that is conveyed to a position of the secondary transfer nip. At this time, a non-transferred toner, which is not transferred to the sheet P, is left on the intermediate transfer belt 8.

Thereafter, the intermediate transfer belt 8 arrives at a position of the intermediate transfer cleaning unit 10. Then, at this position, a non-transferred toner on the intermediate transfer belt 8 is removed. Thus, a series of transferring processes performed on the intermediate transfer belt 8 is completed.

Herein, referring to FIG. 1, the sheet P conveyed to a position of the secondary transfer nip (image transferring unit) is conveyed from a paper feeding unit 26 disposed at a bottom side of the apparatus body 100, through a paper carriage roller 27, a first conveying path K1, and a second conveying path K2.

In detail, a plurality of sheets P such as transfer papers are overlappingly stored in the paper feeding unit 26. Then, when the paper carriage roller 27 is rotated in a counterclockwise direction of FIG. 1, the uppermost sheet P is conveyed toward the conveying paths K1 and K2.

Also, in the embodiment, a paper feeding unit may also be installed at a side of the apparatus body 100, and a sheet P may be conveyed from the paper feeding unit through the conveying path to a position of the secondary transfer nip (image transferring unit).

Then, the sheet P is conveyed by a pair of registration rollers (31, 32, see FIG. 3) installed immediately before the secondary transfer nip (upstream side), in accordance with a timing of a color image on the intermediate transfer belt 8, toward the secondary transfer nip (image transferring unit). At this time, a length of the sheet P in a conveying direction (sheet length) is measured by the registration rollers 31 and 32 that function as a portion of the sheet length measuring device 30. Then, a desired color image is transferred onto the sheet P.

Also, a configuration and operation of the sheet length measuring device 30 will be described later in more detail with reference to FIGS. 3 to 6.

Thereafter, the sheet P, on which a color image is transferred at a position of the secondary transfer nip, is conveyed through a third conveying path K3 to a position of a fixing unit 20. Then, at this position, by the heat and pressure from a fixing roller and a pressing roller, the color image transferred on the surface is fixed onto the sheet P.

Thereafter, sheets P are discharged by a pair of discharging rollers through a discharge path K4 to the outside of the apparatus. As an output image, the sheets P discharged to the outside of the apparatus by the pair of discharging rollers are sequentially stacked on a stack unit 70. Thus, in the image forming apparatus, a series of image forming processes in a single-sided print mode is completed.

Herein, in addition to the above-described single-sided print mode, the image forming apparatus 100 according to the embodiment may perform a double-sided print mode that performs an image forming operation on a front side and a rear side of a sheet P.

In the double-sided print mode, the sheet P after completion of the fixing process in the above-described single-sided print mode (the sheet P delivered from the fixing unit 20) is conveyed toward a reverse path K5 (reverse unit 80), not toward the discharge path K4, by the movement of a switching claw (not illustrated). Then, with leading/trailing ends reversed at this position, the sheet P conveyed to the reverse unit 80 is conveyed toward a double-sided conveying path K6 by the driving of a reverse roller 81 and the movement of a switching claw (not illustrated). Thereafter, the sheet P is conveyed to the secondary transfer nip (image transferring unit) by the registration rollers 31 and 32 through the second conveying path K2 merged from the double-sided conveying path K6, so that a desired color image is transferred onto a rear side thereof. At this time, at a position of the registration rollers 31 and 32, like the single-side print mode, a length of the sheet P in the conveying direction is measured by the sheet length measuring device 30.

Thereafter, the sheet P having a color image transferred on the rear side at a position of the secondary transfer nip is conveyed through the third conveying path K3 to a position of the fixing unit 20. Then, at this position, by the heat and pressure from the fixing roller and pressing roller, the color image transferred to the rear side is fixed onto the sheet P.

Thereafter, sheets P are discharged by the discharging roller pair through the discharge path K4 to the outside of the apparatus and are sequentially stacked on the stack unit 70. Thus, in the image forming apparatus, a series of image forming processes in the double-sided print mode is completed.

Next, a configuration and operation of the developing unit in the image forming unit will be described in more detail with reference to FIG. 2.

The developing unit 5Y includes a developing roller 51Y opposite to the photosensitive drum 1Y, a doctor blade 52Y opposite to the developing roller 51Y, two conveying screws 55Y disposed in a developer housing unit, a toner replenishing path 43Y communicated through an opening to the developer housing unit, and a density detecting sensor 56Y configured to detect a toner density in a developer. The developing roller 51Y includes a magnet tightly installed therein, a sleeve rotating around the magnet, or the like. A two-component developer including carrier particles and toner is housed in the developer housing unit.

The developing unit 5Y configured in this way operates as follows. The sleeve of the developing roller 51Y rotates in the arrow direction of FIG. 2. Then, a developer carried on the developing roller 51Y by a magnetic field formed by the magnet moves on the developing roller 51Y according to the rotation of the sleeve. Herein, a developer in the developing unit 5Y is adjusted such that a ratio of toner in the developer (toner density) is within a predetermined range.

Then, a toner replenished in the developer housing unit circulates in two isolated developer housing units (which is a movement in a vertical direction of a paper plane of FIG. 2) while being mixed/agitated with developer by the two conveying screws 55Y. Then, toner in the developer is adsorbed to carrier particles by the triboelectric charging with the carrier particles, and is carried on the developing roller 51Y together with the carrier particles by a magnetic force formed on the developing roller 51Y.

The developer carried on the developing roller 51Y is conveyed in the arrow direction of FIG. 2 and arrives at a position of the doctor blade 52Y. Then, after the developer amount is moderated at this position, the developer on the developing roller 51Y is conveyed to an opposite position with respect to the photosensitive drum 1Y (which is a developing region). Then, by an electric field formed on the developing region, a toner is adsorbed to a latent image formed on the photosensitive drum 1Y. Thereafter, a developer left on the developing roller 51Y arrives at a top side of the developer housing unit according to the rotation of the sleeve, and at this position, the developer is separated from the developing roller 51Y.

Next, a characteristic sheet length measuring device 30 in the embodiment will be described in detail with reference to FIGS. 3 to 6. Also, in the following description, in detail, a registration roller pair includes a driving roller and a driven roller that are paired together, and will be suitably referred to as the registration rollers 31 and 32, or a driving roller 31 and a driven roller 32.

Figure 4:
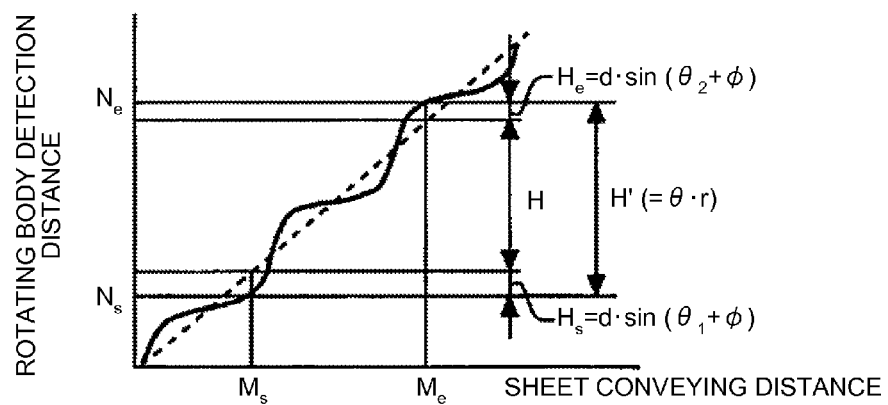
FIG. 4 is a graph illustrating a relation between a sheet conveying distance and a rotating body detection distance when there is an eccentricity in a rotating body.

Referring to FIGS. 3 and 4, the sheet length measuring device 30 includes a registration roller pair 31 and 32 serving as a rotating body, a position detecting sensor 36 serving as a position detecting unit (pass detecting unit), an encoder 35 serving as a rotation amount measuring unit, a storage unit 38, a calculating unit 37, and an image adjusting unit 39. According to a control program stored in a ROM 51, a CPU 50 realizes the functions of the calculating unit 37 and the image adjusting unit 39 that will be described later. Also, a RAM 52 is used as a working memory or the like according to the control of the CPU 50.

As a rotating body, the registration roller pair 31 and 32 rotates according to the movement of a sheet P in a conveying direction. In detail, the registration roller pair includes a driving roller 31 rotated in a counterclockwise direction of FIG. 3 by a driving motor 34, and a driven roller 32 rotated in a clockwise direction of FIG. 3 by the frictional resistance with the driving roller 31 while nipping the sheet P. By operating the driving motor 34, the registration roller pair 31 and 32 is rotated and the sheet P is conveyed toward the secondary transfer nip (image transferring unit).

In addition to the driving motor 34, the encoder 35 serving as a rotation amount measuring unit is connected to a shaft unit of one end side of the driving roller 31 serving as a rotating body. The encoder 35 serving as a rotation amount measuring unit measures a rotation amount of the driving roller 31 (rotating body). The encoder 35 is configured to output a pulse signal as an origin signal whenever the driving roller 31 (rotating body) rotates once (hereinafter, a pulse signal as a Z phase in the embodiment).

In detail, the encoder 35 (rotation amount measuring unit) is a unit configured to output a pulse signal according to the rotation of a rotating body (the driving roller 31 in the case of the embodiment). A rotation amount (angle) of a rotating body is measured by counting the number of pulses outputted from the encoder 35.

Also, in the embodiment, the encoder 35 is used as a rotation amount measuring unit. On the other hand, a unit used in motor rotation, such as a tachometer or a resolver, or a unit having an electric resistance value changed by a rotation angle, such as a rotary positioner or a potentiometer, may be used as the rotation amount measuring unit.

The position detecting sensor 36 serving as a position detecting unit (pass detecting unit) is a photosensor that optically detects a leading end and a trailing end of a sheet P passing through a position of the driving roller 31 (rotating body). The position detecting sensor 36 is installed at a downstream side with respect to the driving roller 31 (rotating body) (a downstream side of the sheet P in a conveying direction).

In detail, when a leading end of the sheet P conveyed by the registration rollers 31 and 32 is detected by the position detecting sensor 36 (position detecting unit), the detected information is provided to the calculating unit 37. In addition, when a trailing end of the sheet P conveyed by the registration rollers 31 and 32 is detected by the position detecting sensor 36 (position detecting unit), the detected information is provided to the calculating unit 37. In other words, the pass timing of the leading end of the sheet P and the pass timing of the trailing end are detected by the position detecting sensor 36.

The storage unit 38 stores deviations (changes or displacement amount) from ideal values of the respective rotation angles (rotation amounts) in one revolution of the driving roller 31 (rotating body) measured by the encoder 35 (rotation amount measuring unit) with respect to an output of a Z phase (origin signal). Herein, typically, the deviation corresponds to a sinusoidal waveform illustrated in FIG. 4, and is calculated by the calculating unit 37.

Also, the calculating unit 37 (conveying amount calculating unit) corrects and calculates a length of the sheet P (length in a conveying direction) from a measurement value calculated from a rotation angle of the driving roller 31 with respect to an output of a Z phase when the leading end of the sheet P is detected by the position detecting sensor 36, and a measurement value calculated from a rotation angle of the driving roller 31 with respect to an output of a Z phase when the trailing end of the sheet P is detected by the position detecting sensor 36.

In this manner, in the embodiment, the calculating unit 37 corrects and calculates a sheet length from information on a rotation amount obtained from the encoder 35, a signal at the time of the pass of the leading/trailing ends of the sheet P obtained from the position detecting sensor 36, and information on a deviation of a rotation amount of the driving roller 31 stored in the storage unit 38. Also, together with a control unit of the apparatus body 100, the calculating unit 37 or the storage unit 38 may be installed in the apparatus body 100 as a program calculating processing apparatus such as a microcomputer, a DSP (digital signal processor), or the like.

Hereinafter, the process of correcting and calculating a sheet length described above will be described in more detail. FIG. 4 is a graph illustrating a relation between a sheet conveying distance and a rotating body detection distance when there is an eccentricity in the driving roller 31 (rotating body). In FIG. 4, a horizontal axis represents a conveying amount of a sheet P (sheet conveying distance), and a vertical axis represents a rotation amount (rotating body detection distance) measured by the encoder 35.

When there is an eccentricity or a deformation in a rotating body (driving roller 31 in the embodiment) in which the rotation amount is measured by the encoder 35, since the rotation amount of which is measured by the encoder 35, since a distance from a center to an outer periphery of the rotating body is changed, a rotation angle of the rotating body and a conveying amount (moving amount) of the outer periphery are not proportional to each other. In particular, when there is an eccentricity in the rotating body, a change (deviation) in a sinusoidal waveform occurs at periods of one revolution of the rotating body (one-revolution periods) as illustrated in FIG. 4. In FIG. 4, a dashed straight line represents a relation between a sheet conveying distance and a rotating body detection distance in an ideal rotating body that has no eccentricity or deformation.

Referring to FIG. 4, when the driving roller 31 (rotating body) is rotated and a sheet P is conveyed, and if $M_s$ in the graph is a leading end position of the sheet P and $M_e$ in the graph is a trailing end position, a sheet length H' calculated by multiplying a rotation amount measured by the encoder 35 by an average radius of the rotating body (driving roller 31) is equal to an actual sheet length H plus the following deviation values ($H'=H+H_s+H_e$).

$$\text{Deviation value } H_s = d \cdot \sin(\theta_1 + \phi) \quad (1)$$

$$\text{Deviation value } H_e = d \cdot \sin(\theta_2 + \phi) \quad (2)$$

In the above equations, d denotes a variable amplitude by eccentricity, $\theta_1$ denotes a rotating body phase at the detection of a sheet leading end, $\theta_2$ denotes a rotating body phase at the detection of a sheet leading end, and $\phi$ denotes a phase difference between a rotating body phase and an eccentricity sine wave (phase information).

In the sheet length measuring device 30 (the image forming apparatus 100) according to the embodiment, first, when a change (eccentricity) in the driving roller 31 (rotating body) occurs as illustrated in FIG. 4, the state is measured by the encoder 35 and calculated by the calculating unit 37. Then, the calculation result (which is a sinusoidal waveform) calculated by the calculating unit 37 is stored in the storage unit 38. Specifically, two data of a variable amplitude d and a phase difference $\phi$ are stored in the storage unit 38. The measurement/storage of such a measurement value (deviation) may be performed in a non-conveyed mode before the sheet P is conveyed. Also, the variable amplitude d and the phase difference $\phi$ may be suitably calculated by (1) Fourier transform, (2) least square approximation, (3) quadrature detection, or the like. Also, the variable amplitude d and the phase difference $\phi$ may be calculated by being fitted to a sine wave as in a second embodiment that will be described later.

Then, when the leading/trailing ends of the sheet P pass through the position of the position detecting sensor 36 respectively, the timings are detected by the position detecting sensor 36 and $H_s$ and $H_e$ in Equations (1) and (2) are obtained based on the detection values. Then, finally, the obtained values $H_s$ and $H_e$ are subtracted from the value H' calculated from the measurement values, and a corrected sheet length H" (=H'−($H_e+H_s$)) is calculated as a correction value.

In this manner, the correction/calculation of a sheet length in the embodiment is performed by calculating the respective measurement values from a rotation angle (phase) from a Z phase output with respect to a leading end of the sheet P and a rotation angle (phase) from a Z phase output with respect to a trailing end of the sheet P.

Figure 5:
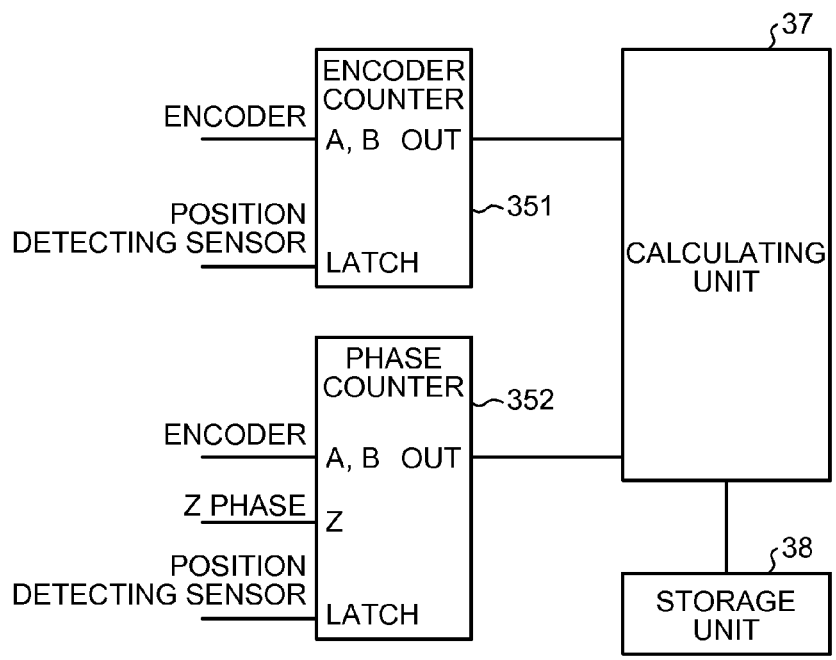
FIG. 5 is a block diagram illustrating a counter unit of a sheet length measuring device.

FIG. 5 is a block diagram illustrating a counter unit in the sheet length measuring device 30. As illustrated in FIG. 5, the counter unit includes an encoder counter 351 and a phase counter 352 configured to measure a phase. An input of the encoder and a Z phase input of the encoder 35 are provided to the phase counter 352. Also, as in the encoder counter 351, a signal input of the position detecting sensor 36 is used to latch a counter value in the phase counter 352.

Figure 6:
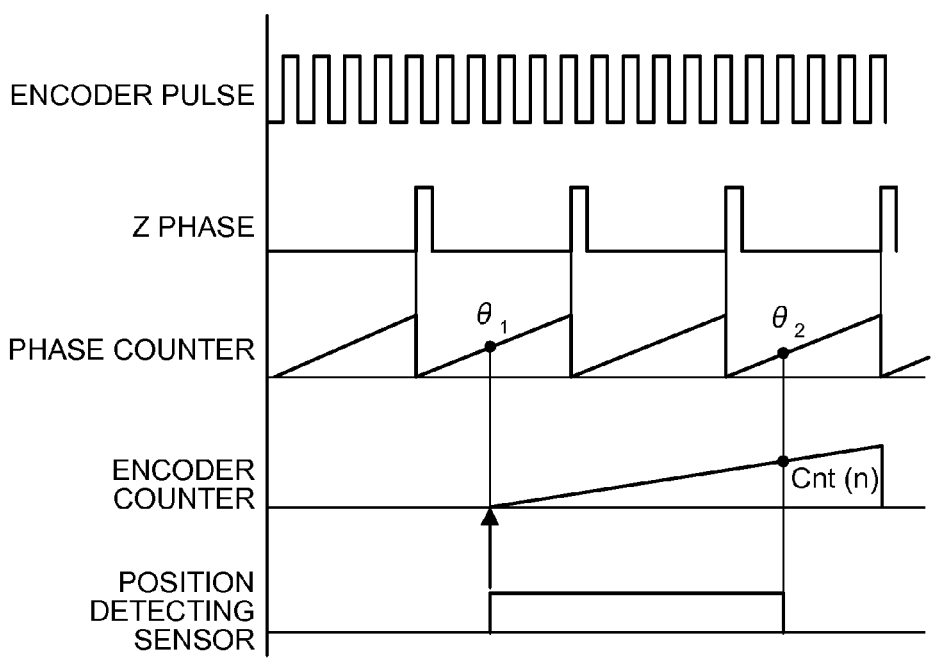
FIG. 6 is a timing chart illustrating a measuring operation performed by a sheet length measuring device.

Referring to FIG. 6, when the driving roller 31 (rotating body) is rotated, an encoder pulse is generated and a count error is generated according to a rotation error of the driving roller 31. A waveform of the count error varies according to a waveform error of the driving roller 31 serving as a rotating body. On the other hand, since the phase counter is reset every time by a Z phase of the encoder, a signal of the position detecting sensor increases. Thus, a count value at the time of latching a count value (encoder counter) becomes a count value after generation of a Z phase, and a phase $\theta_1$ of the leading end of the sheet P is measured. In addition, the phase counter is also latched at the falling of the position detecting sensor, and a phase $\theta_2$ of the trailing end of the sheet P is measured. Thus, the so-obtained leading end phase $\theta_1$ and trailing end phase $\theta_2$ are substituted in the above Equations (1) and (2) to calculate a measurement error-corrected sheet length H'.

In this manner, according to the embodiment, a phase from the origin signal of each of the leading/trailing ends of the sheet P is detected, and a sheet length correction calculation can be easily performed by adding a deviation (difference) from each of the calculated ideal values of the leading/trailing ends to a conventional sheet length (a reference sheet length). Therefore, even when eccentricity, thermal expansion, or the like occurs in the driving roller 31 serving as a rotating body, a length of the sheet P can be measured with a high degree of accuracy by a relatively simple and easy method.

Herein, in a double-sided print mode, in order to measure a sheet length of the sheet P conveyed toward the secondary transfer nip in a front-side print mode and a sheet length of the sheet P conveyed toward the secondary transfer nip in a rear-side print mode, the sheet length measuring device 30 according to the embodiment is installed at a position in the second conveying path K2 reaching the secondary transfer nip (the position of the registration rollers 31 and 32). Accordingly, by one sheet length measuring device 30, a sheet length before an image is transferred on each of the front side and the rear side at a position of the secondary transfer nip in a double-sided print mode can be obtained with a high degree of accuracy.

Herein, a sheet length H' obtained by the sheet length measuring device 30 according to the embodiment (which is corrected and calculated) is provided to the image adjusting unit 39. Then, image magnification ratio adjustment based on the sheet length H' is performed by the image adjusting unit

39. In other words, an image magnification ratio of a latent image formed on the photosensitive drums 1Y, 1M, 1C, and 1K of the respective image forming units 6Y, 6M, 6C, and 6K by the exposing unit 7 is adjusted and optimized according to a size of the sheet P.

In particular, in a double-sided print mode, unlike the sheet P in a front side print mode, the sheet P in a rear side print mode is mostly heated and expanded in the fixing unit 20. Therefore, a front/rear image magnification ratio change in the double-sided print mode due to a sheet length change of the sheet P caused by fixing heat is corrected to perform a double-sided print output aligned in positions of both sides. In other words, in a front-side print mode and a rear-side print mode, a sheet length of the sheet P is accurately calculated, and each image magnification ratio is optimized based on the accurate sheet length.

Also, in the embodiment, the driving roller 31 of the registration roller pair is used as a rotating body where the encoder 35 is installed, and one position detecting sensor 36 is used as a position detecting unit that detects the leading/trailing ends of the sheet P.

Figure 7:
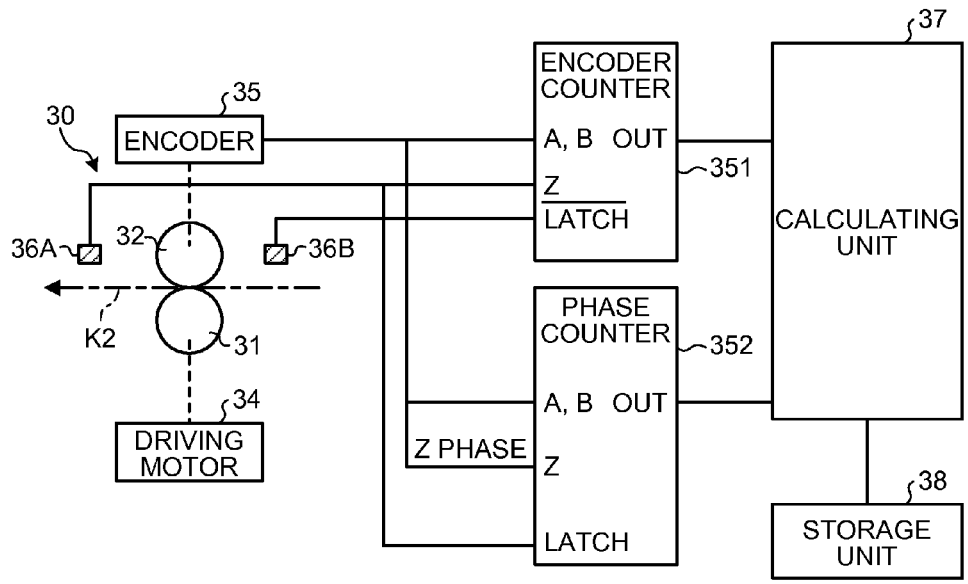
FIG. 7 is a schematic diagram illustrating a sheet length measuring device in another mode.

On the other hand, as illustrated in FIG. 7, the driven roller 32 may be used as a rotating body where the encoder 35 is installed, and two position detecting sensors 36A and 36B may be used as a position detecting unit that detects the leading/trailing ends of the sheet P. In detail, in a sheet length measuring device 30 illustrated in FIG. 7, the encoder 35 is installed at one side shaft unit of the driven roller 32. Also, the first position detecting sensor 36A is installed to detect the leading end of the sheet P in a downstream side of the sheet P with respect to the driven roller 32 (rotating body), and the second position detecting sensor 36B is installed to detect the trailing end of the sheet P in an upstream side of the sheet P with respect to the driven roller 32 (rotating body).

Also, the encoder counter 351 is connected such that a signal of the first position detecting sensor 36A is inputted as a Z phase input and a signal of the second position detecting sensor 36B is inputted to the latch. The phase counter 352 is connected such that a Z phase of the encoder 35 is inputted as an origin signal and a signal of the first position detecting sensor 36A is inputted to the latch.

Figure 8:
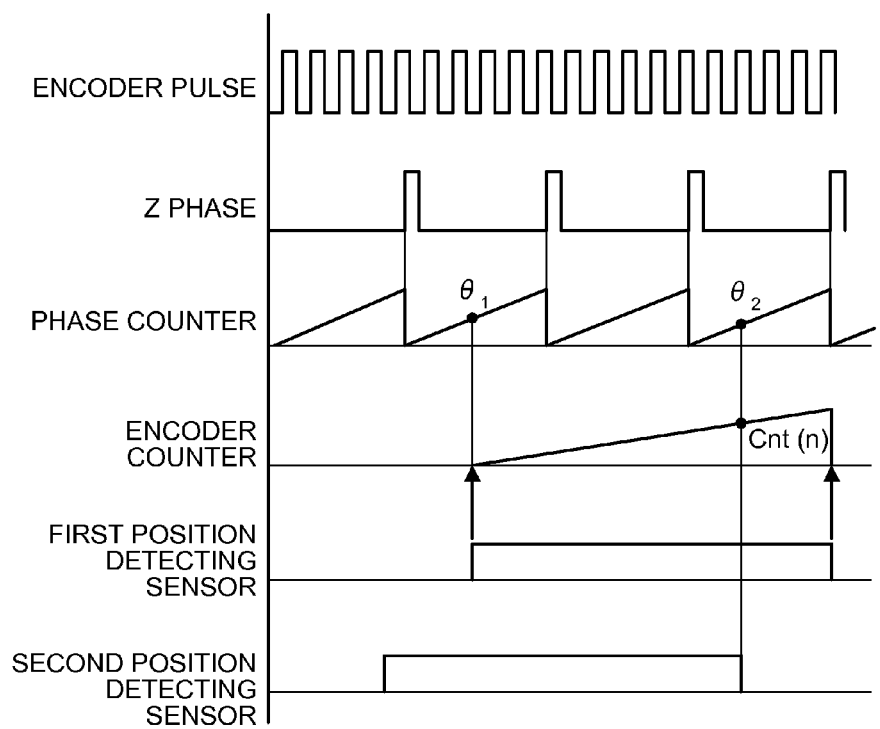
FIG. 8 is a timing chart illustrating a measuring operation performed by the sheet length measuring device of FIG. 7.

FIG. 8 is a timing chart illustrating a measuring operation (counter operation) performed by the sheet length measuring device 30 of FIG. 7.

First, the phase counter 352 is reset by a Z phase (origin signal) of the encoder 35 and is latched at the rising of the first position detecting sensor 36A, so that a leading end phase of the sheet P is detected. On the other hand, the encoder counter 351 is reset at the rising of the first position detecting sensor 36A and is latched at the falling of the second position detecting sensor 36B, to detect an encoder rotation amount until the sheet P passes through a position of the second position detecting sensor 36B after being detected by the first position detecting sensor 36A. In other words, a length corresponding to a difference between the total length of the sheet P and the interval between the first position detecting sensor 36A and the second position detecting sensor 36B. Therefore, in order to calculate a length of the sheet P, it is necessary to add the interval between the first position detecting sensor 36A and the second position detecting sensor 36B to the detected rotation amount.

In this configuration, since the trailing end phase of the sheet P is not measured and a sheet length before correction is measured by the encoder counter 351, if a measured sheet length is H and a circumferential length of the rotating body is $H_0$, a count value $Cnt(\theta_2)$ of a trailing end phase $\theta_2$ may be calculated by the following equation.

$$Cnt(\theta_2) = H \% H_0$$

Also, in the above equation, % denotes an operator for calculation of a remainder of division. Then, as in the embodiment, a sheet length is corrected and calculated from the calculated phase, and image magnification ratio adjustment is performed by the image adjusting unit 39 based on the correction/calculation result.

In this manner, in the sheet length measuring device 30 of FIG. 7, since the position detecting sensors 36A and 36B are installed at the upstream/downstream sides of the rotating body respectively to detect and correct a sheet length, an influence of a slip or a speed change of the rotating body (driven roller 32) can be reduced when the sheet P rushes between the registration roller pair 31 and 32. Accordingly, a sheet length can be measured with a higher degree of accuracy.

As described above, in the embodiment, since a length of the sheet P is corrected and calculated from a measurement value (measurement error) calculated from a rotation angle of the driving roller 31 (rotating body) with respect to an origin signal output when the leading end of the sheet P is detected, and a measurement value (measurement error) calculated from a rotation angle of the driving roller 31 (rotating body) with respect to a Z phase output when the trailing end of the sheet P is detected, even when an eccentricity, a thermal expansion, or the like occurs in the driving roller 31 (rotating body), a length of the sheet P can be measured with a high degree of accuracy by a relatively simple and easy method.

Also, in the embodiment, the invention is applied to the sheet length measuring device 30 that measures a length of the sheet P (recording medium) conveyed toward the image transferring unit (secondary transfer nip).

Figure 9:
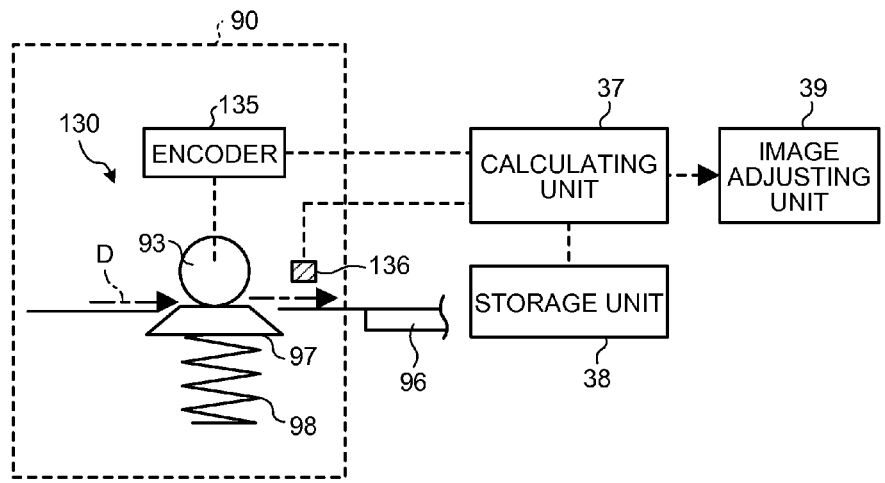
FIG. 9 is a schematic diagram illustrating a configuration example of another sheet length measuring device according to the first embodiment.

On the other hand, as illustrated in FIG. 9, the invention may be applicable to a sheet length measuring device 130 that measures a length of a sheet (document D) conveyed toward a document reading unit 95 (contact glass 96). Herein, in a document conveying unit 90 illustrated in FIG. 9, at an upstream side of the document reading unit 95 (contact glass 96), a platen guide 97 is biased by a spring 98, and a carriage roller 93 (rotating body) is installed to rotate in a counter-clockwise direction of FIG. 9 according to the feeding of a document D (sheet). At a shaft unit of the carriage roller 93, an encoder 135 is installed as a rotation amount measuring unit. Also, at a downstream side of the carriage roller 93 (rotating body), a position detecting sensor 136 is installed as a position detecting unit that detects the leading/trailing ends of the document D. The encoder 135 or the position detecting sensor 136 is connected to a calculating unit 37, and operates in the same way as the encoder 35 or the position detecting sensor 36 in the embodiment, to correct and calculate a sheet length of the sheet (document D). A reading magnification ratio of the document reading unit 95 with respect to the document D is adjusted based on the corrected calculated sheet length.

Second Embodiment

In a second embodiment, a characteristic sheet length measuring device 30 in the embodiment will be described in detail by using the same configurations as the image forming apparatus of FIG. 1 and the image forming unit of FIG. 2 described above.

Figure 10:
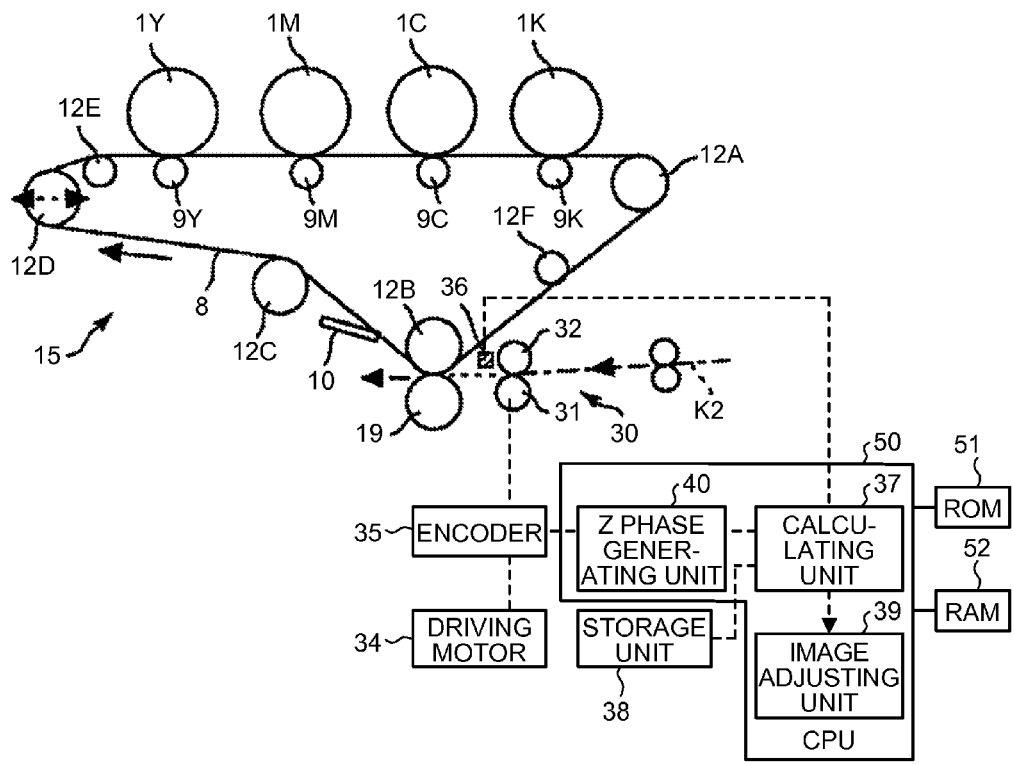
FIG. 10 is an explanatory diagram illustrating a configuration of a sheet length measuring device and a configuration of a neighborhood thereof according to a second embodiment.

FIG. 10 is an illustration diagram illustrating a configuration of a sheet length measuring device and a configuration of a neighborhood thereof according to the second embodiment. The configuration is different from the configuration of FIG. 3 in that a Z phase generating unit 40 is disposed between an encoder 35 and a calculating unit 37. Also, with regard to other configurations, same reference numerals or symbols of FIG. 3 will be used to denote elements having the same functions, and a redundant description thereof will not be repeated.

As illustrated in FIG. 10, a sheet length measuring device 30 includes registration roller pairs 31 and 32 serving as a rotating body, a position detecting sensor 36 serving as a position detecting unit (pass detecting unit), the encoder 35 serving as a rotation amount measuring unit, a storage unit 38, the Z phase generating unit 40 (z phase detecting unit) serving, the calculating unit 37, and an image adjusting unit 39. According to a control program stored in a ROM 51, a CPU 50 realizes the functions of the Z phase generating unit 40, the calculating unit 37, and the image adjusting unit 39 that will be described later. Also, a RAM 52 is used as a working memory or the like according to the control of the CPU 50.

From a rotation unevenness in one revolution of a driving roller 31 (rotating body) measured by the encoder 35 (rotation amount measuring unit), the Z phase generating unit 40 generates and outputs a pulse signal as a Z phase when the driving roller 31 rotates one revolution. In other words, without the need to install a specific member such as a sensor for obtaining an origin signal (Z phase) in the rotation of the driving roller 31, the Z phase generating unit 40 detects an origin signal (Z phase) based on the measurement result of the encoder 35 and outputs a pulse signal as a Z phase.

The storage unit 38 stores measurement errors of rotation angles (rotation amount) in one revolution of the driving roller 31 (rotating body) measured by the encoder 35 (rotation amount measuring unit) with respect to an output of a Z phase generated and outputted (detected) from the Z phase generating unit 40. Herein, typically, the measurement error corresponds to a sinusoidal waveform illustrated in FIG. 4, and is calculated by the calculating unit 37.

Also, the calculating unit 37 (conveying amount calculating unit) corrects and calculates a length of the sheet P (length in a conveying direction) from a deviation (measurement error U) calculated from a rotation angle of the driving roller 31 with respect to an output of a Z phase (which is generated and outputted from the Z phase generating unit 40) when the leading end of the sheet P is detected by the position detecting sensor 36, and a deviation (measurement error) calculated from a rotation angle of the driving roller 31 with respect to an output of a Z phase (which is generated and outputted from the Z phase generating unit 40) when the trailing end of the sheet P is detected by the position detecting sensor 36.

In this manner, in the embodiment, the calculating unit 37 corrects and calculates a sheet length from information on a rotation amount obtained from the encoder 35, a signal at the time of the pass of the leading/trailing ends of the sheet P obtained from the position detecting sensor 36, and information on an error of a rotation amount of the driving roller 31 stored in the storage unit 38. Also, together with an image adjusting unit 39 of the apparatus body 100, the Z phase generating unit 40, the calculating unit 37, or the storage unit 38 may be installed in the apparatus body 100 as a program operation processing unit such as a microcomputer, a DSP, or the like.

Hereinafter, the process of correcting and calculating a sheet length described above will be described in more detail. Also, herein, with regard to the description made with reference to FIGS. 4 to 6 described above, a redundant description is included because it is the process of correcting and calculating a sheet length.

FIG. 4 is a graph illustrating a relation between a sheet conveying distance and a rotating body detection distance when there is an eccentricity in the driving roller 31 (rotating body). In FIG. 4, a horizontal axis represents a conveying amount of a sheet P (sheet conveying distance), and a vertical axis represents a rotation amount (rotating body detection distance) measured by the encoder 35.

When there is an eccentricity or a deformation in a rotating body (driving roller 31 in the embodiment), since the rotation amount of which is measured by the encoder 35, since a distance from a center to an outer periphery of the rotating body is changed, a rotation angle of the rotating body and a conveying amount (moving amount) of the outer periphery are not proportional to each other. In particular, when there is an eccentricity in the rotating body, a change (deviation) in a sinusoidal waveform occurs at periods of one revolution of the rotating body (one-revolution periods) as illustrated in FIG. 4. In FIG. 4, a dashed straight line represents a relation between a sheet conveying distance and a rotating body detection distance in an ideal rotating body that has no eccentricity or deformation.

Referring to FIG. 4, when the driving roller 31 (rotating body) is rotated and a sheet P is conveyed, and if $M_s$ in the graph is a leading end position of the sheet P and $M_e$ in the graph is a trailing end position, a sheet length H' calculated by multiplying a rotation amount measured by the encoder 35 by an average radius of the rotating body (driving roller 31) is equal to an actual sheet length H plus the following deviation values ($H' = H + H_s + H_e$).

$$\text{Deviation value } H_s = d \cdot \sin(\theta_1 + \phi) \tag{1}$$

$$\text{Deviation value } H_e = d \cdot \sin(\theta_2 + \phi) \tag{2}$$

In the above equations, d denotes a variable amplitude by eccentricity, $\theta_1$ denotes a rotating body phase at the detection of a sheet leading end, $\theta_2$ denotes a rotating body phase at the detection of a sheet leading end, and $\phi$ denotes a phase difference between a rotating body phase and an eccentricity sine wave.

In the sheet length measuring device 30 (the image forming apparatus 100) according to the embodiment, first, when a change (eccentricity) in the driving roller 31 (rotating body) occurs as illustrated in FIG. 4, the state is measured by the encoder 35 and calculated by the calculating unit 37. Then, the measurement error (which is a sinusoidal shape error) calculated by the calculating unit 37 is stored in the storage unit 38. The measurement/storage of such a measurement error may be performed in a non-conveyed mode before the sheet P is conveyed.

Then, when the leading/trailing ends of the sheet P pass through the position of the position detecting sensor 36, the timings are detected by the position detecting sensor 36 and $H_s$ and $H_e$ in Equations (1) and (2) are obtained based on the detection values. Then, finally, the obtained values $H_s$ and $H_e$ are subtracted from the value H' calculated from the measurement values, and a corrected sheet length H" ($= H' - (H_e + H_s)$) is calculated as a correction value.

In this manner, the correction/calculation of a sheet length in the embodiment is performed by calculating the respective measurement errors from a rotation angle (phase) from a Z phase output with respect to a leading end of the sheet P and a rotation angle (phase) from a Z phase output with respect to a trailing end of the sheet P.

FIG. 5 is a block diagram illustrating a counter unit in the sheet length measuring device 30. As illustrated in FIG. 5, the counter unit includes an encoder counter 351 and a phase counter 352 configured to measure a phase. An input of the encoder and a Z phase input of the encoder 35 are provided to the phase counter 352. Also, as in the encoder counter 351, a signal input of the position detecting sensor 36 is used to latch a counter value in the phase counter 352.

Referring to FIG. 6, when the driving roller 31 (rotating body) is rotated, an encoder pulse is generated and a count error is generated according to a rotation error of the driving roller 31. A waveform of the count error varies according to a shape error of the driving roller 31 serving as a rotating body. On the other hand, since the phase counter is reset every time by a Z phase of the encoder, a signal of the position detecting sensor increases. Thus, a count value at the time of latching a count value (encoder counter) becomes a count value after generation of a Z phase, and a phase $\theta_1$ of the leading end of the sheet P is measured. In addition, the phase counter is also latched at the falling of the position detecting sensor, and a phase $\theta_2$ of the trailing end of the sheet P is measured. Thus, the so-obtained leading end phase $\theta_1$ and trailing end phase $\theta_2$ are substituted in the above Equations (1) and (2) to calculate a measurement error-corrected sheet length H'.

Also, a sheet length H' may be calculated according to the following equation by using the encoder count value of the encoder counter 351. In the following equation, $P_{enc}$ denotes the number of encoder pulses in one revolution of the driving roller 31 (rotating body) (the number of encoder divisions), r denotes a radius of the driving roller 31, and Cnt denotes a count value obtained from the encoder counter 351.

$$H' = Cnt \cdot 2\pi r / P_{enc}$$

Also, when the respective count values are $C_{ph1}$ and $C_{ph2}$, a leading end phase $\theta_1$ and a trailing end phase $\theta_2$ may be calculated according to the following equation.

$$\theta_1 = (C_{ph1}/P_{enc}) \cdot 2\pi \, [rad]$$

$$\theta_2 = (C_{ph2}/P_{enc}) \cdot 2\pi \, [rad]$$

Figure 11:
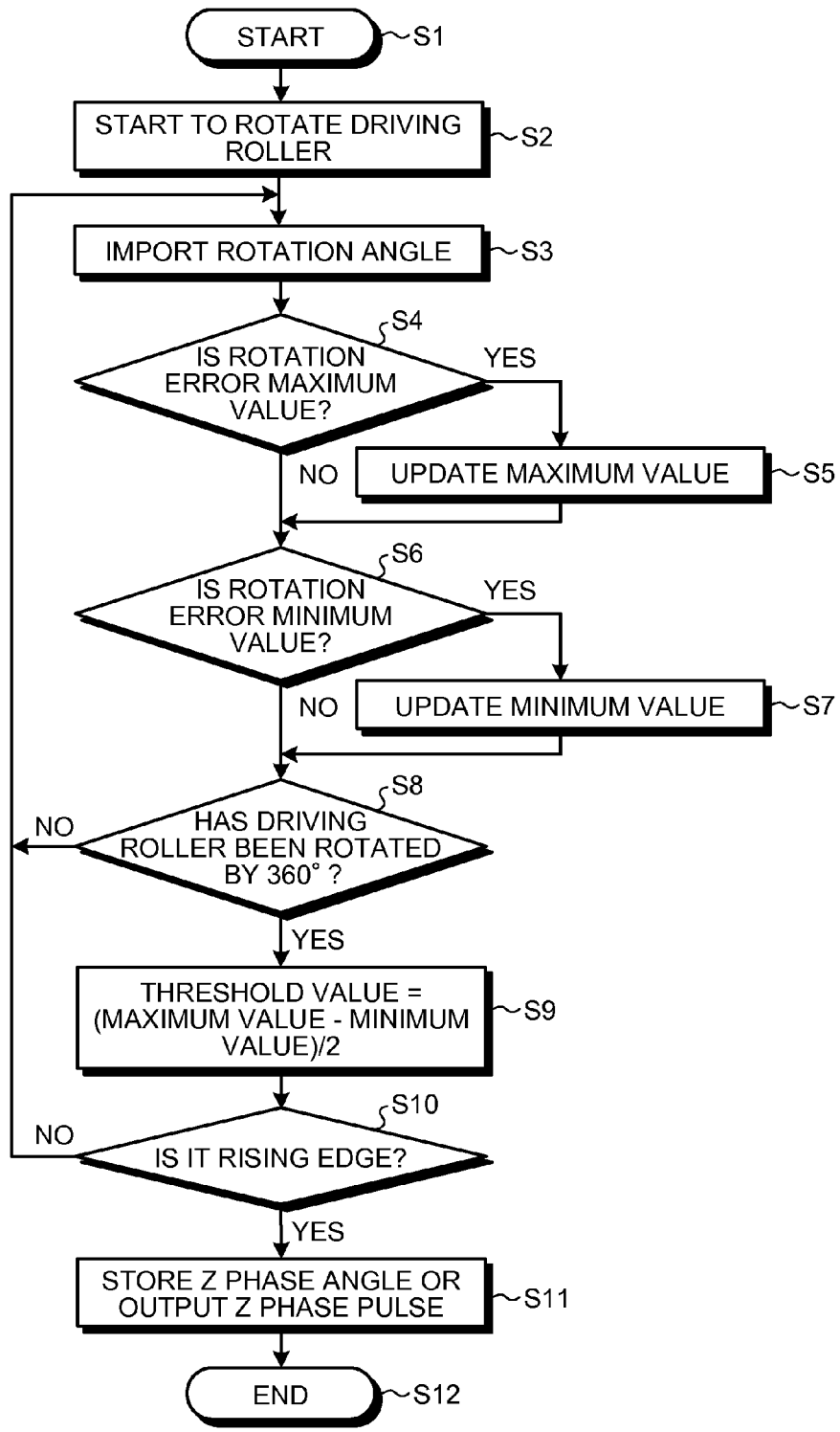
FIG. 11 is a flow chart illustrating a Z phase detection controlling operation according to the second embodiment.

Hereinafter, a Z phase detection control in the Z phase generating unit 40 will be described with reference to FIG. 11.

First, when a recording medium P starts to pass and the driving roller 31 (rotating body) is rotated in steps S1 and S2, a rotation angle of the driving roller 31 is imported by the encoder 35 to the calculating unit 37 or the Z phase generating unit 40 in step S3.

In detail, a pulse signal from the encoder 35 installed in the driving roller 31 is inputted to the phase counter 352, and a count value of the encoder pulse counted in the encoder counter 351 is output. Then, in the calculating unit 37, an encoder count value is acquired and converted into a rotation angle. Also, the phase counter 352 is set to be reset at a count corresponding to 360° so that a rotation angle of 0° to 360° is obtained.

Such rotation angle importation is performed at predetermined sampling periods, and a process after step S4 is performed in each sampling period.

First, rotation angle error (rotation angle deviation) is calculated from the imported rotation angle. Then, in step S4, it is determined whether the calculated rotation angle error is greater than a maximum value prestored. When it is determined in step S4 that the calculated rotation angle error is the maximum value, the value is updated (stored) as the maximum value in step S5. Also, the rotation angle error is calculated by a difference between the imported rotation angle and a rotation angle (reference angle) in the case where the driving roller 31 (rotating body) is rotated at a predetermined angular velocity.

Thereafter, in step S6, it is determined whether the calculated rotation angle error is smaller than a minimum value stored. When it is determined in step S6 that the calculated rotation angle error is the minimum value, the value is updated (stored) as the minimum value in step S7.

Thereafter, in step S8, it is determined whether the rotation angle is equal to or greater than 360°. When it is determined in step S8 that the rotation angle is equal to or greater than 360°, detection of a Z phase is performed in steps S9 and S10.

Figure 12:
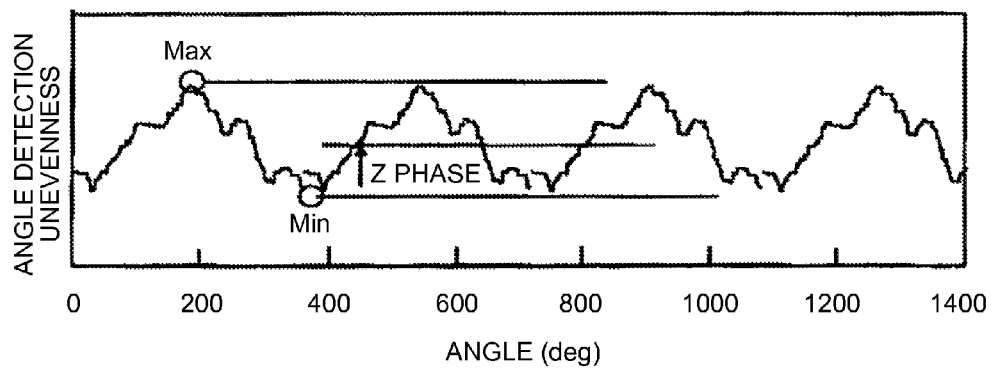
FIG. 12 is a graph illustrating an example of a relation between a rotation angle of a rotating body and an angle detection unevenness.

Specifically, referring to FIG. 12, the detection of a Z phase includes setting (Maximum Value (Max)−Minimum Value (Min))/2 as a threshold value in step S9 and detecting a rising edge where the rotation error exceeds the threshold value in step S10. In other words, when a rotation angle is imported as illustrated in FIG. 12, a position of "Max" in FIG. 12 is detected as a maximum value and a position of "Min" in FIG. 12 is detected as a minimum value, so that "Z phase" in FIG. 12 is detected.

When a Z phase is detected in steps S9 and S10, the relevant rotation angle is stored in the storage unit 38 in step S11. Also, when the measurement of a sheet length is started, the rotation angle is reset at the detection time point of the Z phase to output a Z phase pulse every 360°. Or, when the rotation angle is the rotation angle stored in the storage unit 38, a Z phase is outputted in step S11. Then, the control flow is ended in step S12.

Figure 13:
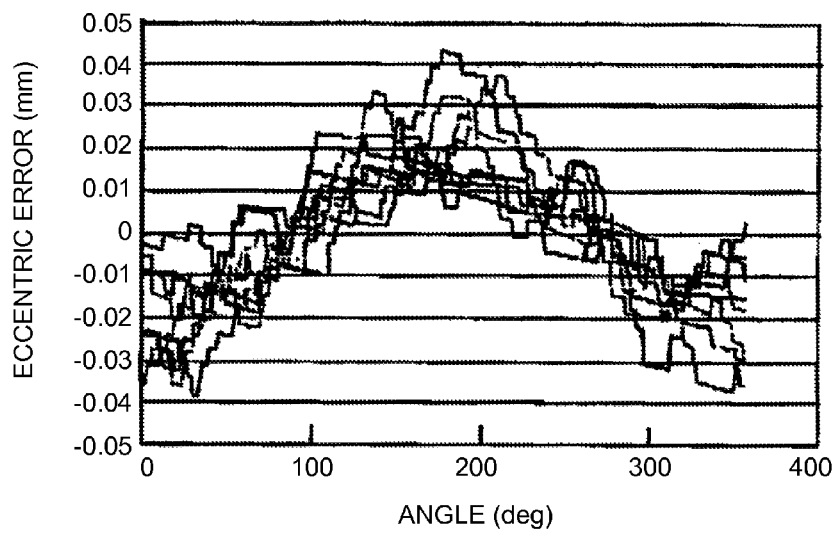
FIG. 13 is a graph illustrating an example of a change in an eccentric error at each rotation of a rotating body.

Next, a method of detecting a Z phase with a high degree of accuracy will be described with reference to FIGS. 13 and 14. For example, a waveform of an eccentric error at each rotation of the driving roller 31 (rotating body) is acquired by the encoder 35 as illustrated in FIG. 13. Such waveform is generated according to the process below.

(1) Rotate the driving roller 31 (rotating body) and wait until the rotation is stabilized.

(2) Start the encoder counter 351, sample an encoder count value at predetermined periods, and accumulate the rotation amounts of the respective periods in the storage unit 38.

(3) Stop the rotation of the driving roller 31 when time data corresponding to a predetermined round number N was imported.

(4) End the importation when the rotation of the driving roller 31 is stopped.

(5) Convert a sequence of accumulated encoder count values into a rotation angle.

(6) Start importation and extract the time data corresponding to the round number N as accumulated data.

(7) Since the rotation angle increases almost linearly with time, perform fitting to a linear function and subtract a fitted function. By this operation, a measurement error varying around 0 is obtained.

(8) Cut out an obtained measurement error waveform at each period corresponding to the rotation of the driving roller 31.

According to the above process, a measurement error waveform at each rotation of the driving roller 31 can be obtained as illustrated in FIG. 13.

Figure 14:
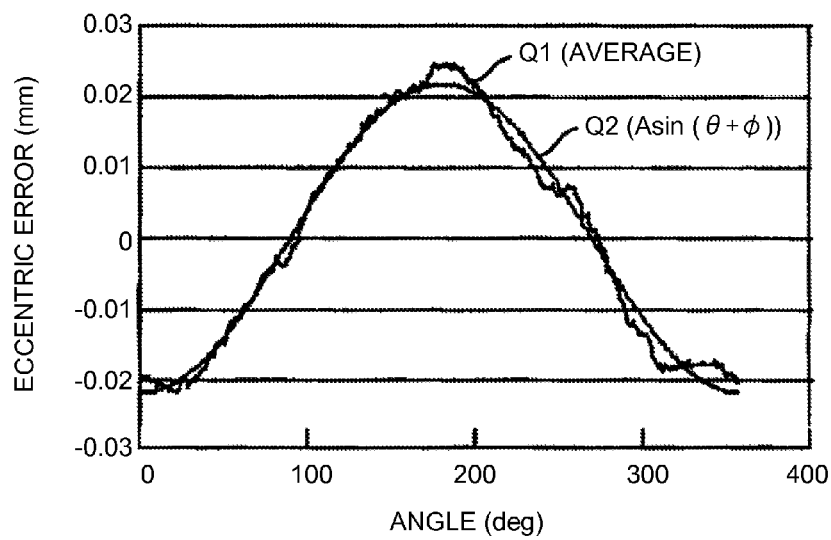
FIG. 14 is a graph illustrating an example of an averaging-processed and fitting-processed eccentric error at each rotation of a rotating body.

FIG. 14 illustrates an example of performing an averaging processing of data in each round of FIG. 13 and also fitting the result to a sine function. By the averaging processing, a noise component except a periodic component of the driving roller 31 (rotating body) is removed and a variable component included in one revolution of the driving roller 31 is extracted. As a result of the fitting to a sine wave, in an example of FIG. 14, an amplitude becomes 0.022 and a phase becomes 89.4°. The obtained phase(89.4° is used as an origin signal (Z phase) of the driving roller 31 serving as a rotating body.

In this operation control, since the rotation angle at the rotation stop time point of the driving roller 31 is stored, the phase counter is set to be reset at each 360° rotation from the next operation. When the counter is reset once at an 89.4° rotation from the start of rotation, a reset position of the counter is equal to an angle of a phase 0° of an error variation. Then, a pulse is outputted at the counter reset timing, so that it can be used as a Z phase.

In this manner, according to the embodiment, the Z phase generating unit 40 detects (generates/outputs) a Z phase based on the measurement result of the encoder 35. A phase from the origin signal of each of the leading/trailing ends of the sheet P is detected, and a sheet length correction calculation can be easily performed by adding a deviation (difference) from each of the calculated measurement errors of the leading/trailing ends to a conventional sheet length (a reference sheet length). Therefore, even when eccentricity, thermal expansion, or the like occurs in the driving roller 31 serving as a rotating body, a length of the sheet P can be measured with a high degree of accuracy by a relatively simple and easy method.

Herein, in a double-sided print mode, in order to measure a sheet length of the sheet P conveyed toward the secondary transfer nip in a front-side print mode and a sheet length of the sheet P conveyed toward the secondary transfer nip in a rear-side print mode, the sheet length measuring device 30 according to the embodiment is installed at a position in the second conveying path K2 (the position of the registration rollers 31 and 32) reaching the secondary transfer nip. Accordingly, by one sheet length measuring device 30, a sheet length before an image is transferred on each of the front side and the rear side at a position of the secondary transfer nip in a double-sided print mode can be obtained with a high degree of accuracy.

Herein, a sheet length H' obtained by the sheet length measuring device 30 according to the embodiment (which is corrected and calculated) is provided to the image adjusting unit 39. Then, image magnification ratio adjustment based on the sheet length H' is performed by the image adjusting unit 39. In other words, an image magnification ratio of a latent image formed on the photosensitive drums 1Y, 1M, 1C, and 1K of the respective image forming units 6Y, 6M, 6C, and 6K by the exposing unit 7 is adjusted and optimized according to a size of the sheet P.

In particular, in a double-sided print mode, unlike the sheet P in a front side print mode, the sheet P in a rear side print mode is mostly heated and expanded. Therefore, a front/rear image magnification ratio change in the double-sided print mode due to a sheet length change of the sheet P caused by fixing heat is corrected to perform a double-sided print output aligned in positions of both sides. In other words, in a front-side print mode and a rear-side print mode, a sheet length of the sheet P is accurately calculated, and each image magnification ratio is optimized based on the accurate sheet length.

Also, in the embodiment, the driving roller 31 of the registration roller pair is used as a rotating body where the encoder 35 is installed, and one position detecting sensor 36 is used as a position detecting unit that detects the leading/trailing ends of the sheet P.

Figure 15:
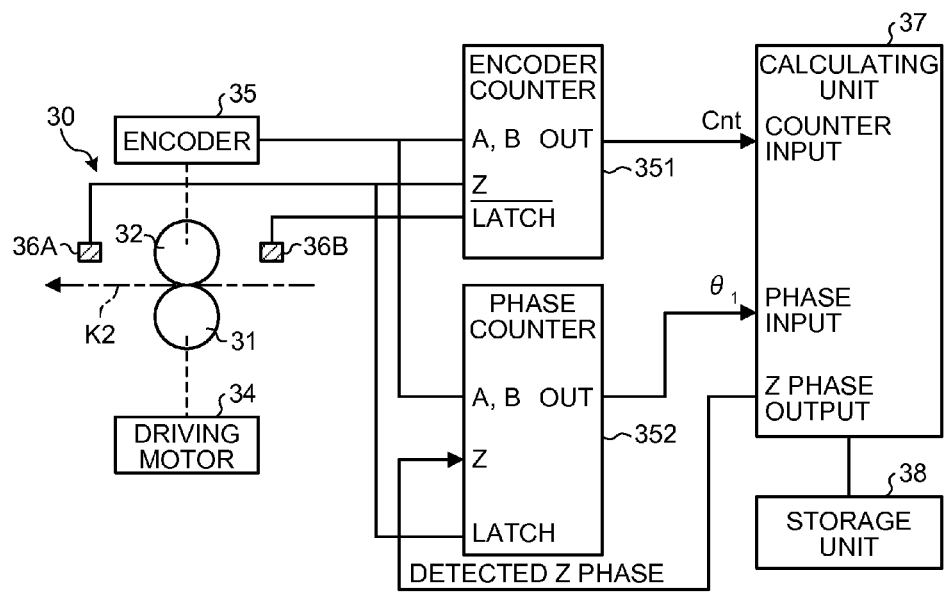
FIG. 15 is a schematic diagram illustrating a configuration example of another sheet length measuring device according to the second embodiment.

On the other hand, as illustrated in FIG. 15, the driven roller 32 may be used as a rotating body where the encoder 35 is installed, and two position detecting sensors 36A and 36B are used as a position detecting unit that detects the leading/trailing ends of the sheet P. In detail, in a sheet length measuring device 30 illustrated in FIG. 15, the encoder 35 is installed at one side shaft unit of the driven roller 32. Also, the first position detecting sensor 36A is installed to detect the leading end of the sheet P in a downstream side of the sheet P with respect to the driven roller 32 (rotating body), and the second position detecting sensor 36B is installed to detect the trailing end of the sheet P in an upstream side of the sheet P with respect to the driven roller 32 (rotating body).

Also, the encoder counter 351 is connected such that a signal of the first position detecting sensor 36A is inputted as a Z phase input and a signal of the second position detecting sensor 36B is inputted to the latch. The phase counter 352 is connected such that a Z phase generated from the calculating unit 37 (in this example, the Z phase generating unit is integrated therein) is inputted as a Z phase input and a signal of the first position detecting sensor 36A is inputted to the latch.

Figure 16:
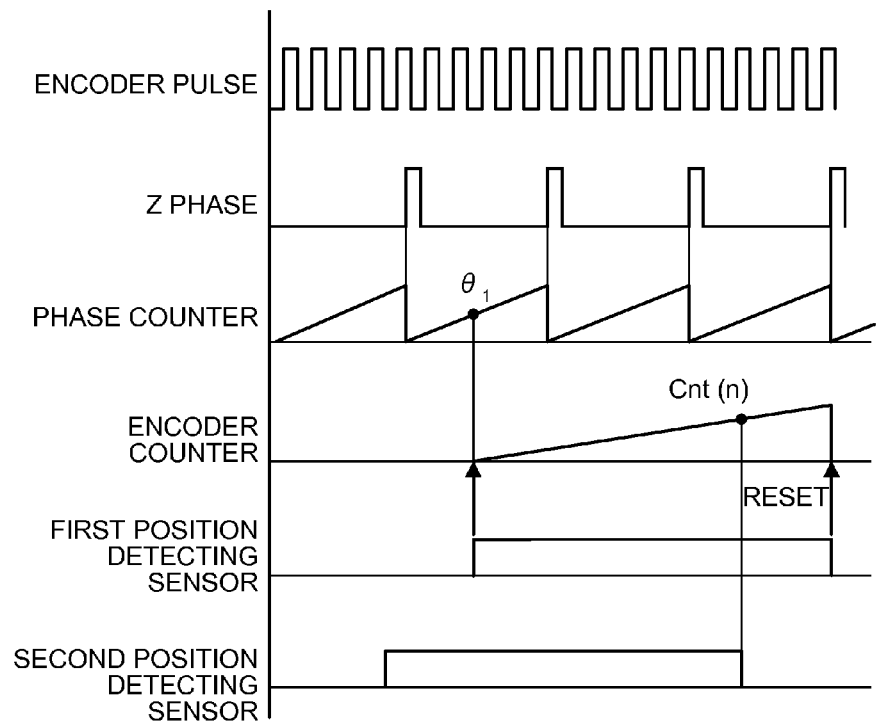
FIG. 16 is a timing chart illustrating a measuring operation performed by the sheet length measuring device of FIG. 15.

FIG. 16 is a timing chart illustrating a measuring operation (counter operation) performed by the sheet length measuring device 30 of FIG. 15.

First, the phase counter 352 is reset by a Z phase and is latched at the rising of the first position detecting sensor 36A, so that a leading end phase of the sheet P is detected. On the other hand, the encoder counter 351 is reset at the rising of the first position detecting sensor 36A and is latched at the falling of the second position detecting sensor 36B, to detect an encoder rotation amount until the sheet P passes through a position of the second position detecting sensor 36B after the sheet P is detected by the first position detecting sensor 36A. In other words, a length corresponding to a difference between the total length of the sheet P and the interval between the first position detecting sensor 36A and the second position detecting sensor 36B is detected. Therefore, in order to calculate a length of the sheet P, it is necessary to add the interval between the first position detecting sensor 36A and the second position detecting sensor 36B to the detected rotation amount.

In this configuration, though the trailing end phase of the sheet P is not measured, a sheet length before correction is measured by the encoder counter 351, so when a measured sheet length is H and a circumferential length of the rotating body is $H_0$, a count value $Cnt(\theta_2)$ of a trailing end phase $\theta_2$ may be calculated by the following equation.

$$Cnt(\theta_2) = H \% H_0$$

Also, in the above equation, % denotes an operator for calculation of a remainder of division. Then, as in the embodiment, a sheet length is corrected and calculated from the calculated phase, and image magnification ratio adjustment is performed based on the correction/calculation result.

In this manner, in the sheet length measuring device 30 of FIG. 15, since the position detecting sensors 36A and 36B are installed respectively at the upstream/downstream sides of the rotating body to detect and correct a sheet length, an influence of a slip or a speed change of the rotating body (driven roller 32) can be reduced when the sheet P rushes between the registration rollers 31 and 32. Accordingly, a sheet length can be measured with a higher degree of accuracy.

As described above, in the embodiment, without installing a specific member for obtaining a rotation origin of the driving roller 31 (rotating body), an origin signal (Z phase) is generated and outputted from a rotation unevenness (continuous deviation; a variable component included in one revolution) corresponding to one revolution of the driving roller 31 measured by the encoder 35 (rotation amount measuring unit). Since a length of the sheet P is corrected and calculated from a value calculated from a rotation angle of the driving roller 31 with respect to an origin signal output when the leading end of the sheet P is detected, and a value calculated from a rotation angle of the driving roller 31 with respect to a Z phase output when the trailing end of the sheet P is detected, even when an eccentricity, a thermal expansion, or the like occurs in the driving roller 31 (rotating body), a length of the sheet P can be measured with a high degree of accuracy by a relatively simple and easy method.

Also, in the embodiment, the invention is applied to the sheet length measuring device 30 that measures a length of the sheet P (recording medium) conveyed toward the image transferring unit (secondary transfer nip).

Figure 17:
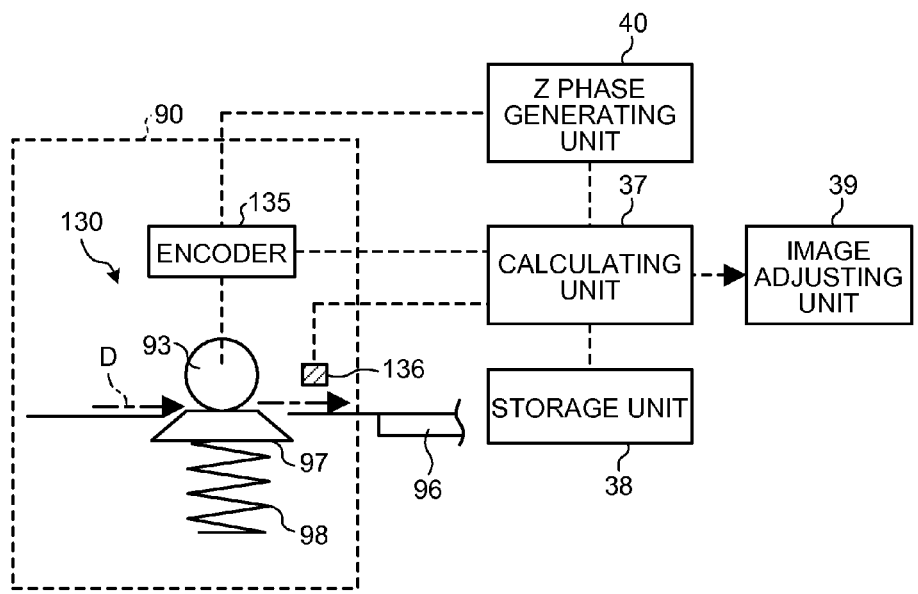
FIG. 17 is a schematic diagram illustrating a configuration example of a sheet length measuring device in yet another mode.

On the other hand, as illustrated in FIG. 17, the invention may be applicable to a sheet length measuring device 130 that measures a length of a sheet (document D) conveyed toward a document reading unit 95 (contact glass 96). Herein, in a document conveying unit 90 illustrated in FIG. 17, at an upstream side of the document reading unit 95 (contact glass 96), a platen guide 97 biased by a spring 98 is biased, and a carriage roller 93 (rotating body) is installed to rotate in a counterclockwise direction of FIG. 17 according to the feeding of a document D (sheet). At a shaft unit of the carriage roller 93, an encoder 135 is installed as a rotation amount measuring unit. Also, at a downstream side of the carriage roller 93 (rotating body), a position detecting sensor 136 is installed as a position detecting unit that detects the leading/trailing ends of the document D. The encoder 135, the Z phase generating unit 40, or the position detecting sensor 136 is connected to a calculating unit 37, and operates in the same way as the encoder 35, the Z phase generating unit 40, or the position detecting sensor 36 according to the present embodiment, so that a sheet length of the sheet (document D) is corrected and calculated. A reading magnification ratio of the document reading unit 95 with respect to the document D is adjusted based on the corrected calculated sheet length.

Also, in the embodiment, the invention is applied to a sheet length measuring device that is installed in a color image forming apparatus using an intermediate transfer body such as an intermediate transfer belt 8. However, the application of the invention is not limited thereto. For example, the invention may also be applicable to a sheet length measuring device that is installed in other types of image forming apparatuses such as a monochrome image forming apparatus, in which an intermediate transfer body is not installed. Even in this case, the same effect as in the embodiment can be achieved. Also, although the embodiment illustrates an image forming apparatus that transfers a toner onto a sheet (recording medium), the image forming method is not limited thereto. For example, the configuration of the invention may use other image forming means such as an ink-jet method that forms an image by ejecting ink onto a sheet.

Also, the invention is not limited to the embodiments. It will be apparent that the invention includes the suggestions in the embodiments and the embodiments may be suitably modified within the technical scope of the invention. Also, the positions, the shapes, and the number of components are not limited to the embodiments, and they may be modified suitably in implementing the invention.

Although the programs executed in the embodiments are illustrated as being previously installed and provided in the ROM 51, the invention is not limited thereto. The programs executed in the embodiments may be recorded as files of installable formats or executable formats in a computer-readable recording medium such as a CD-ROM, a FD (flexible disk), a CD-R, a DVD (digital versatile disk), or the like, and may be provided as a computer program product.

Also, the programs executed in the embodiments may be stored on a computer connected to a network such as the Internet or the like, and may be downloaded and provided through a network. Also, the programs executed in the embodiments may be provided and distributed through a network such as the Internet or the like.

The programs executed in the embodiments include a module configuration including the calculating unit 37, the image adjusting unit 39, and the Z phase generating unit 40 described above. As actual hardware, the CPU 50 (processor) reads and executes the programs from the recording medium. Accordingly, the respective units are loaded on a main memory unit such as the RAM 52 or the like, and the calculating unit 37, the image adjusting unit 39, and the Z phase generating unit 40 are generated on the main memory unit.

The sheet length measuring device as described above may be installed in an image forming apparatus such as a copier, a printer, a facsimile, or a multiple function printer thereof.

According to the embodiments, a length of a sheet is corrected and calculated from a deviation calculated from a rotation angle of a rotating body with respect to an origin signal output when a leading end of a sheet is detected, and a deviation calculated from a rotation angle of a rotating body with respect to an origin signal output when a trailing end of a sheet is detected. Accordingly, provided is an effect of being able to measure a length of a sheet with a high degree of accuracy by a relatively simple and easy method even in the event of the occurrence of eccentricity, thermal expansion, or the like in a rotating body.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A sheet length measuring device comprising:
a rotating body configured to rotate with a movement of a sheet in a conveying direction;
a position detecting unit configured to detect a leading end and a trailing end of the sheet passing through a position of the rotating body;
a rotation amount measuring unit configured to measure a rotation amount of the rotating body and output a pulse signal as an origin signal per one revolution of the rotating body;
a storage unit configured to store changes of a sheet conveying amount with respect to respective rotation angles in one revolution of the rotating body, the rotation angles being measured by the rotation amount measuring unit with respect to an output of the origin signal; and
a calculating unit configured to calculate a corrected length of the sheet from a value obtained from a rotation angle of the rotating body with respect to an output of the origin signal when the leading end of the sheet is detected by the position detecting unit and a value obtained from a rotation angle of the rotating body with respect to an output of the origin signal when the trailing end of the sheet is detected by the position detecting unit.

2. The sheet length measuring device according to claim 1, wherein the calculating unit extracts a one-period component corresponding to one revolution of the rotating body from changes of a sheet conveying amount with respect to the origin signal of the rotating body, and uses an amplitude and a phase of a sine wave corresponding to the one-period component as the changes of the sheet conveying amount with respect to the respective rotation angles in one revolution of the rotating body.

3. The sheet length measuring device according to claim 1, wherein the position detecting unit includes a position detecting sensor that is installed at a downstream side of the sheet in the conveying direction with respect to the rotating body.

4. The sheet length measuring device according to claim 1, wherein the position detecting unit includes a first position detecting sensor installed at a downstream side of the sheet in the conveying direction with respect to the rotating body to detect the leading end of the sheet and a second position detecting sensor installed at an upstream side of the sheet in the conveying direction with respect to the rotating body to detect the trailing end of the sheet.

5. The sheet length measuring device according to claim 1, wherein the sheet length measuring device is installed in a conveying path reaching an image transferring unit, to measure a length of a relevant sheet conveyed toward the image transferring unit configured to transfer an image, which is carried in an image carrier, onto a sheet.

6. The sheet length measuring device according to claim 1, wherein the sheet length measuring device is installed in a conveying path reaching a document reading unit, to measure a length of a relevant sheet conveyed toward the document reading unit configured to read image information formed on the sheet.

7. A sheet length measuring device comprising:
- a rotating body configured to rotate with a movement of a sheet in a conveying direction;
- a position detecting unit configured to detect a leading end and a trailing end of the sheet passing through a position of the rotating body;
- a rotation amount measuring unit configured to measure a rotation amount of the rotating body;
- an origin signal generating unit configured to generate and output a pulse signal as an origin signal per one revolution of the rotating body from variable components in one revolution of the rotating body measured by the rotation amount measuring unit;
- a storage unit configured to store changes of a sheet conveying amount with respect to respective rotation angles in one revolution of the rotating body, the rotation angles being measured by the rotation amount measuring unit with respect to an output of the origin signal from the origin signal generating unit; and
- a calculating unit configured to calculate a corrected length of the sheet from a value obtained from a rotation angle of the rotating body with respect to an output of the origin signal when the leading end of the sheet is detected by the position detecting unit and a value obtained from a rotation angle of the rotating body with respect to an output of the origin signal when the trailing end of the sheet is detected by the position detecting unit.

8. The sheet length measuring device according to claim 7, wherein the calculating unit extracts a one-period component corresponding to one revolution of the rotating body from changes of a sheet conveying amount with respect to the origin signal of the rotating body, and uses an amplitude and a phase of a sine wave corresponding to the one-period component as the changes of the sheet conveying amount with respect to the respective rotation angles in one revolution of the rotating body.

9. The sheet length measuring device according to claim 7, wherein the position detecting unit includes a position detecting sensor that is installed at a downstream side of the sheet in the conveying direction with respect to the rotating body.

10. The sheet length measuring device according to claim 7, wherein the position detecting unit includes a first position detecting sensor installed at a downstream side of the sheet in the conveying direction with respect to the rotating body to detect the leading end of the sheet and a second position detecting sensor installed at an upstream side of the sheet in the conveying direction with respect to the rotating body to detect the trailing end of the sheet.

11. The sheet length measuring device according to claim 7, wherein the sheet length measuring device is installed in a conveying path reaching an image transferring unit, to measure a length of a relevant sheet conveyed toward the image transferring unit configured to transfer an image, which is carried in an image carrier, onto a sheet.

12. The sheet length measuring device according to claim 7, wherein the sheet length measuring device is installed in a conveying path reaching a document reading unit, to measure a length of a relevant sheet conveyed toward the document reading unit configured to read image information formed on the sheet.

13. An image forming apparatus comprising:
- a rotating body configured to rotate with a movement of a sheet in a conveying direction;
- a position detecting unit configured to detect a leading end and a trailing end of the sheet passing through a position of the rotating body;
- a rotation amount measuring unit configured to measure a rotation amount of the rotating body and output a pulse signal as an origin signal per one revolution of the rotating body;
- a storage unit configured to store changes of a sheet conveying amount with respect to respective rotation angles in one revolution of the rotating body, the rotation angles being measured by the rotation amount measuring unit with respect to an output of the origin signal; and
- a calculating unit configured to calculate a corrected length of the sheet from a value obtained from a rotation angle of the rotating body with respect to an output of the origin signal when the leading end of the sheet is detected by the position detecting unit and a value obtained from a rotation angle of the rotating body with respect to an output of the origin signal when the trailing end of the sheet is detected by the position detecting unit.

* * * * *